United States Patent
Wang et al.

(10) Patent No.: US 8,661,174 B2
(45) Date of Patent: Feb. 25, 2014

(54) MASTER-SLAVE SYSTEM WITH REVERSIBLE CONTROL DIRECTION FUNCTION

(75) Inventors: Chung-Jen Wang, New Taipei (TW); Li-Sheng Shu, Shenzhen (CN); Bi-Qing Luo, Shenzhen (CN); Tsung-Jen Chuang, New Taipei (TW); Shih-Fang Wong, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 172 days.

(21) Appl. No.: 13/204,735

(22) Filed: Aug. 8, 2011

(65) Prior Publication Data
US 2012/0324132 A1     Dec. 20, 2012

(30) Foreign Application Priority Data
Jun. 15, 2011   (CN) .......................... 2011 1 0160383

(51) Int. Cl.
*G06F 13/00*       (2006.01)
(52) U.S. Cl.
USPC .................................................. 710/110
(58) Field of Classification Search
USPC .................................................. 710/110
See application file for complete search history.

(56) References Cited

U.S. PATENT DOCUMENTS

| | | | |
|---|---|---|---|
| 5,978,923 A * | 11/1999 | Kou | 713/323 |
| 7,755,506 B1 * | 7/2010 | Clegg et al. | 340/12.3 |
| 2008/0140887 A1 * | 6/2008 | Gallant et al. | 710/100 |
| 2009/0138637 A1 * | 5/2009 | Hargreaves et al. | 710/67 |
| 2009/0261969 A1 * | 10/2009 | Kobayashi | 340/539.11 |
| 2010/0164712 A1 * | 7/2010 | Corrigan | 340/539.13 |

\* cited by examiner

*Primary Examiner* — Nimesh G Patel
(74) *Attorney, Agent, or Firm* — Altis Law Group, Inc.

(57) ABSTRACT

A master-slave system includes a master and a slave. The master includes a first communication interface, a master controller, and a voltage meter. The voltage meter is connected to the first communication interface and the master controller. The slave includes a second communication interface, an input unit, a slave controller, and a control indicator unit. The control indicator unit is connected to the second communication interface and the slave controller. The salve controller controls voltage of a node between the control indicator unit and the second communication interface to change between a high logic level and a low logic level according to signals from the input unit. The voltage meter is connected to the control indicator unit to detect the voltage of the node. The master controller controls the master to execute a function according to change of the obtained voltage within a preset period.

7 Claims, 1 Drawing Sheet

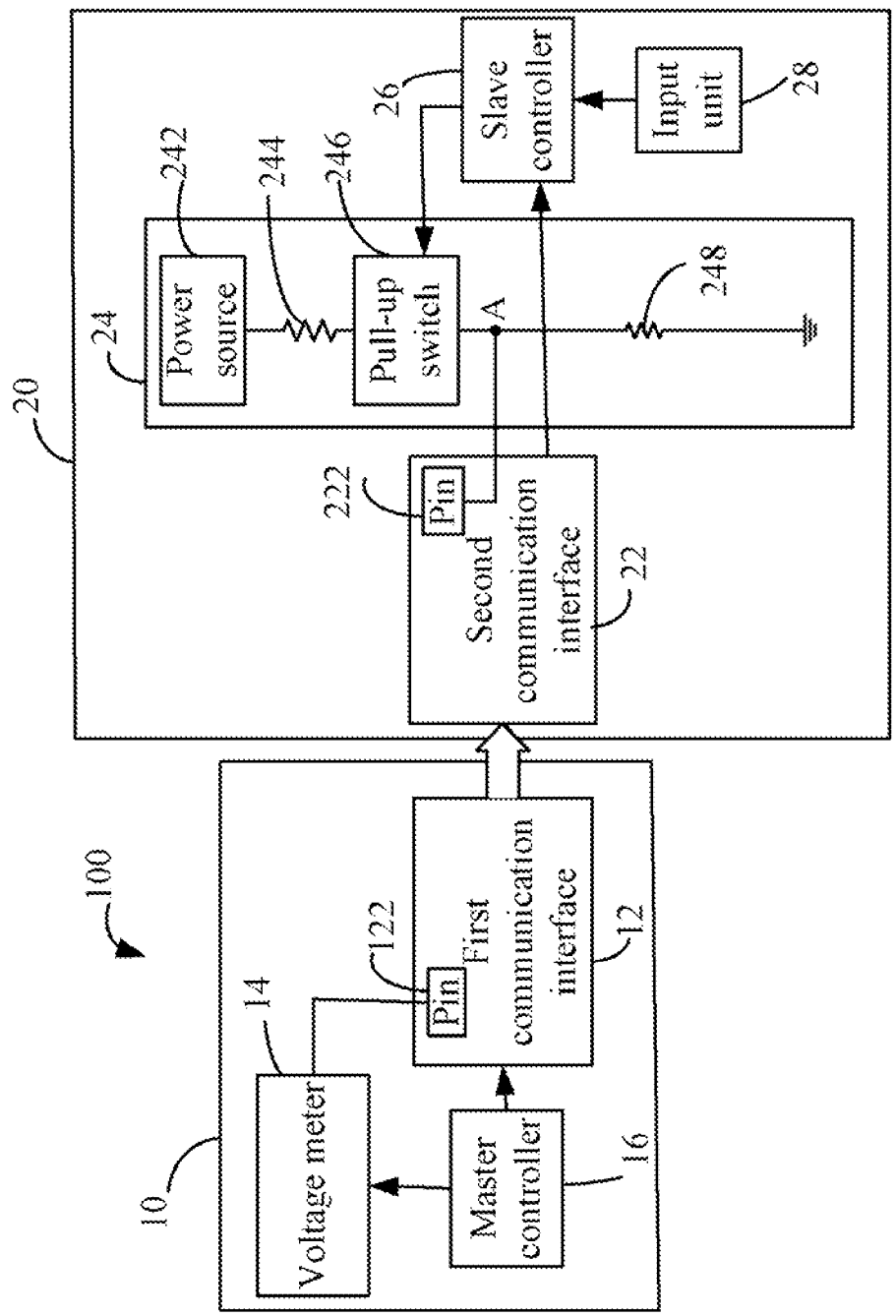

MASTER-SLAVE SYSTEM WITH REVERSIBLE CONTROL DIRECTION FUNCTION

BACKGROUND

1. Technical Field

The present disclosure relates to master-slave systems and, particularly, to a master-slave system having a function whereby a slave device can control a master device.

2. Description of Related Art

It is known that many master-slave systems include a master device or component controlling one or more connected slave devices or components. Buttons of the master can control the one or more slaves, but buttons of the one or more slaves cannot control the master. For example, buttons of a display cannot control functions of a connected computer. Therefore, there is room for improvement within the art.

BRIEF DESCRIPTION OF THE DRAWINGS

The components of the drawing are not necessarily drawn to scale, the emphasis instead being placed upon clearly illustrating the principles of a master-slave system with reversible control function.

The drawing is a block diagram of a master-slave system with reversible control direction function in accordance with an exemplary embodiment.

DETAILED DESCRIPTION

Referring to the drawing, a master-slave system 100 includes a master 10 and a slave 20. The master 10 includes a first communication interface 12, and the slave 20 includes a second communication interface 22. The master 10 communicates with the slave 20 through the first communication interface 12 and the second communication interface 22. In this embodiment, the first communication interface 12 and the second communication interface 22 are video interfaces. The master 10 may be a computer, and the slave 20 may be a display connected to and controlled by the computer.

The slave 20 includes a control indicator unit 24, a slave controller 26, and an input unit 28. The control indicator unit 24 is electrically connected to the slave controller 26 and the second communication interface 22. The slave controller 26 controls voltage of a node A between the control indicator unit 24 and the second communication interface 22 to change between a high logic level and a low logic level according to signals from the input unit 28. The change of the voltage of the node A within a first preset period is used to control the master 10 to execute a function. The input unit 28 may include different buttons. Each button is used to control the master 10 to execute a function, for example, power off the master 10.

In this embodiment, the control indicator unit 24 includes a power source 242, a pull-up resistor 244, a pull-up switch 246, and a pull-down resistor 248. The pull-up switch 246 may be a transistor or a field effect transistor (FET). Two ends of the pull-up resistor 244 are respectively electrically connected to the power source 242 and the switch 246. The pull-up switch 246 is further electrically connected to an end of the pull-down resistor 248, the slave controller 26, and the second communication interface 22. A node between the pull-up switch 246 and the second communication interface 22 is the node A. Another end of the pull-down resistor 248 is grounded. The slave controller 26 selectively turns on or turns off the switch 246 to control the voltage of the node A to change between a high logic level and a low logic level according to signals from the input unit 28. In this embodiment, when the switch 246 is turned on, the voltage of the node A becomes a high logic level, and when the switch 246 is turned off, the voltage of the node A becomes a low logic level. In this embodiment, the pull-up switch 246 is electrically connected to a pin 222 of the second communication interface 22. The voltage of the node A is equal to the voltage of the pin 222.

The master 10 further includes a voltage meter 14 and a master controller 16. The voltage meter 14 is electrically connected to the first communication interface 12 and the master controller 16. The voltage meter 14 is electrically connected to the control indicator unit 24 through the first communication interface 12 and the second communication interface 22. The voltage meter 14 detects the voltage of the node A in real time. The master controller 16 obtains the detected voltage from the voltage meter 14 every a second preset period and controls the master 10 to execute a function according to the change of the obtained voltage within the first preset period. The second preset period is less than the first preset period. In this embodiment, the voltage meter 14 is electrically connected to a pin 122 of the first communication interface 12, and when the master 10 is connected to the slave 20, the pin 122 is electrically connected to the pin 222. Thus, the voltage of the pin 122 is the same as that of the pin 222, and the voltage meter 14 can detect the voltage of the node A by detecting the voltage of the pin 122.

In this embodiment, a user can operate the input unit 28 of the slave 20 to control the master 10 to execute different functions.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A master-slave system comprising:
    a master comprising a first communication interface, a master controller, and a voltage meter, the voltage meter being electrically connected to the first communication interface and the master controller; and
    a slave comprising a second communication interface, an input unit, a slave controller, and a control indicator unit, the second communication interface to communicate with the first communication interface, the control indicator unit being electrically connected to the second communication interface and the slave controller, the slave controller to control voltage of a node between the control indicator unit and the second communication interface to change between a high logic level and a low logic level according to signals from the input unit;
    wherein the voltage meter is further electrically connected to the control indicator unit through the first communication interface and the second communication interface, and detects the voltage of the node between the control indicator unit and the second communication interface;
    the master controller obtains the voltage detected by the voltage meter every a preset interval and controls the master to execute a function according to change of the obtained voltage within a preset period, the preset interval is less than the preset period;
    the control indicator unit comprises a power source, a pull-up resistor, a pull-up switch, and a pull-down resistor, two opposite ends of the pull-up resistor are respectively connected to the power source and the pull-up switch, the pull-up switch is further electrically connected to an end of the pull-down resistor, the slave controller, and the second communication interface, another end of the pull-down resistor is grounded, a node between the pull-up switch and the second communication interface is the node between the control indicator unit and the second communication interface, the slave controller selectively turns on or turns off the pull-up switch to control the voltage of the node between the control indicator unit and the second communication interface to change between a high logic level and a low logic level according to signals from the input unit.

2. The master-slave system as described in claim 1, wherein the pull-up switch is a transistor or a field effect transistor.

3. The master-slave system as described in claim 1, wherein the first communication interface comprises a first pin, the second communication interface comprises a second pin, the first pin is electrically connected to the second pin when the master is electrically connected to the slave, the voltage meter is electrically connected to the first pin, the pull-up switch is electrically connected to the second pin, the voltage of the first pin is the same as that of the second pin, and the voltage of the second pin is the same as that of the node between the voltage indicator unit and the second communication unit.

4. The master-slave system as described in claim 1, wherein the first communication interface and the second communication interface are video interfaces.

5. The master-slave system as described in claim 1, wherein the master is a computer, and the slave is a display.

6. The master-slave system as described in claim 1, wherein the input unit comprises different buttons for controlling the master to execute different functions.

7. The master-slave system as described in claim 6, wherein the different functions comprise a function to power off the master.

* * * * *